(12) United States Patent
Schmidt et al.

(10) Patent No.: US 7,149,523 B2
(45) Date of Patent: Dec. 12, 2006

(54) APPARATUS AND METHOD FOR PERFORMING RADIO ENVIRONMENT REPORTING ON A REVERSE COMMON SIGNALING CHANNEL

(75) Inventors: Christopher R. Schmidt, Pinole, CA (US); John M. Harris, Chicago, IL (US); Sean S. Kelley, Hoffman Estates, IL (US)

(73) Assignee: Motorola, Inc., Schaumburg, IL (US)

(*) Notice: Subject to any disclaimer, the term of this patent is extended or adjusted under 35 U.S.C. 154(b) by 438 days.

(21) Appl. No.: 10/701,095

(22) Filed: Nov. 4, 2003

(65) Prior Publication Data

US 2004/0110511 A1 Jun. 10, 2004

Related U.S. Application Data

(60) Provisional application No. 60/431,880, filed on Dec. 9, 2002.

(51) Int. Cl.
*H04Q 7/00* (2006.01)

(52) U.S. Cl. .................. 455/436; 455/440; 455/67.11; 455/423; 370/331

(58) Field of Classification Search ................ 455/434, 455/435.1, 436–442, 450, 456.1–456, 509, 455/513–517, 423, 67.11; 370/329, 335, 370/345, 348, 350
See application file for complete search history.

(56) References Cited

U.S. PATENT DOCUMENTS

| | | | |
|---|---|---|---|
| 6,621,809 B1 | 9/2003 | Lee et al. | |
| 6,952,411 B1* | 10/2005 | Sinnarajah et al. | 370/335 |
| 7,006,821 B1* | 2/2006 | Tee | 455/450 |
| 2003/0039231 A1 | 2/2003 | Sinnarajah et al. | |
| 2003/0235180 A1* | 12/2003 | Oprescu-Surcobe et al. | 370/348 |

* cited by examiner

*Primary Examiner*—Jean Gelin
*Assistant Examiner*—Kamran Afshar
(74) *Attorney, Agent, or Firm*—Lalita W. Pace

(57) ABSTRACT

Apparatus and method for performing radio environment reporting on a reverse common signaling channel. When a dedicated RF connection between a remote unit (RU) (118) and infrastructure equipment (109) is being released, the RU receives a first message from the infrastructure instructing the RU to perform occasional pilot strength reporting on the reverse common signaling channel (r-csch) while the RU is in the idle state. In the preferred embodiment, the pilot strength reporting is limited by a maximum number of reports and/or a time limit to preserve battery life and prevent r-csch congestion in the system. Preferably, a Radio Environment Report Message, referred to generally herein as a second message, carries radio environment information (REI), such as pilot strength and phase of the best pilots measured, and helps the infrastructure both with tracking the RU location and with selecting a strong set of pilots for channel assignment.

19 Claims, 4 Drawing Sheets

APPARATUS AND METHOD FOR PERFORMING RADIO ENVIRONMENT REPORTING ON A REVERSE COMMON SIGNALING CHANNEL

REFERENCE(S) TO RELATED APPLICATION(S)

The present application claims priority from provisional application, Ser. No. 60/431,880, entitled "APPARATUS AND METHOD FOR PERFORMING RADIO ENVIRONMENT REPORTING ON A REVERSE COMMON SIGNALING CHANNEL," filed Dec. 9, 2002, which is commonly owned and incorporated herein by reference in its entirety.

FIELD OF THE INVENTION

The present invention relates generally to the field of communication systems, and more particularly, to radio environment reporting to reduce call setup delay in communications equipment.

BACKGROUND OF THE INVENTION

Communication systems are known to comprise an infrastructure, typically including a plurality of base transceiver stations (BTSs), and other equipment that provides communication services to communication units located in corresponding service coverage areas of the BTSs. One example of such a communication system is a cellular communication system. In a cellular system, a remote unit (RU) (e.g., a mobile station, portable radiotelephone, personal digital assistant, pager, laptop computer, to name a few) that desires to communicate, sends a channel request message to a BTS serving the coverage area in which the RU is located. Upon receiving the channel request message, the infrastructure of the cellular system allocates a communication channel for the communication, and the RU begins communicating with a telephone network subscriber or another RU via the serving BTS. Typically, multiple access wireless communication between the BTS and the RU occurs via a dedicated radio frequency (RF) channel (connection), also known as a traffic channel, that provides a path over which communication signals such as voice, data, and video are transmitted.

When the RU is engaged in an active packet data session and data exchange between the RU and the infrastructure ceases, the RU transitions to the idle state. In the idle state, the dedicated RF connection is released and the RU leaves the traffic channel. Currently, when the infrastructure has data to transmit to the RU, the infrastructure pages the RU because the infrastructure may not know the current location of the RU. The infrastructure must wait for a page response from the RU in order to learn the unit's location. Then, the infrastructure can assign a communication channel and begin transmitting data. The page/page response procedure is acceptable for voice traffic but is not acceptable for data applications because it takes too much time for the RU to be assigned to the communication channel. An ideal situation for data applications is for the RU to appear to the user as though it is always on channel. Thus, minimizing delay in the channel setup is critical.

Thus, there is a need for an apparatus and method for performing radio environment reporting on a reverse common signaling channel. Such an apparatus and method can be used to enable faster traffic channel assignment for an RU that is off of the traffic channel.

DETAILED DESCRIPTION OF THE DRAWINGS

Figure 1:
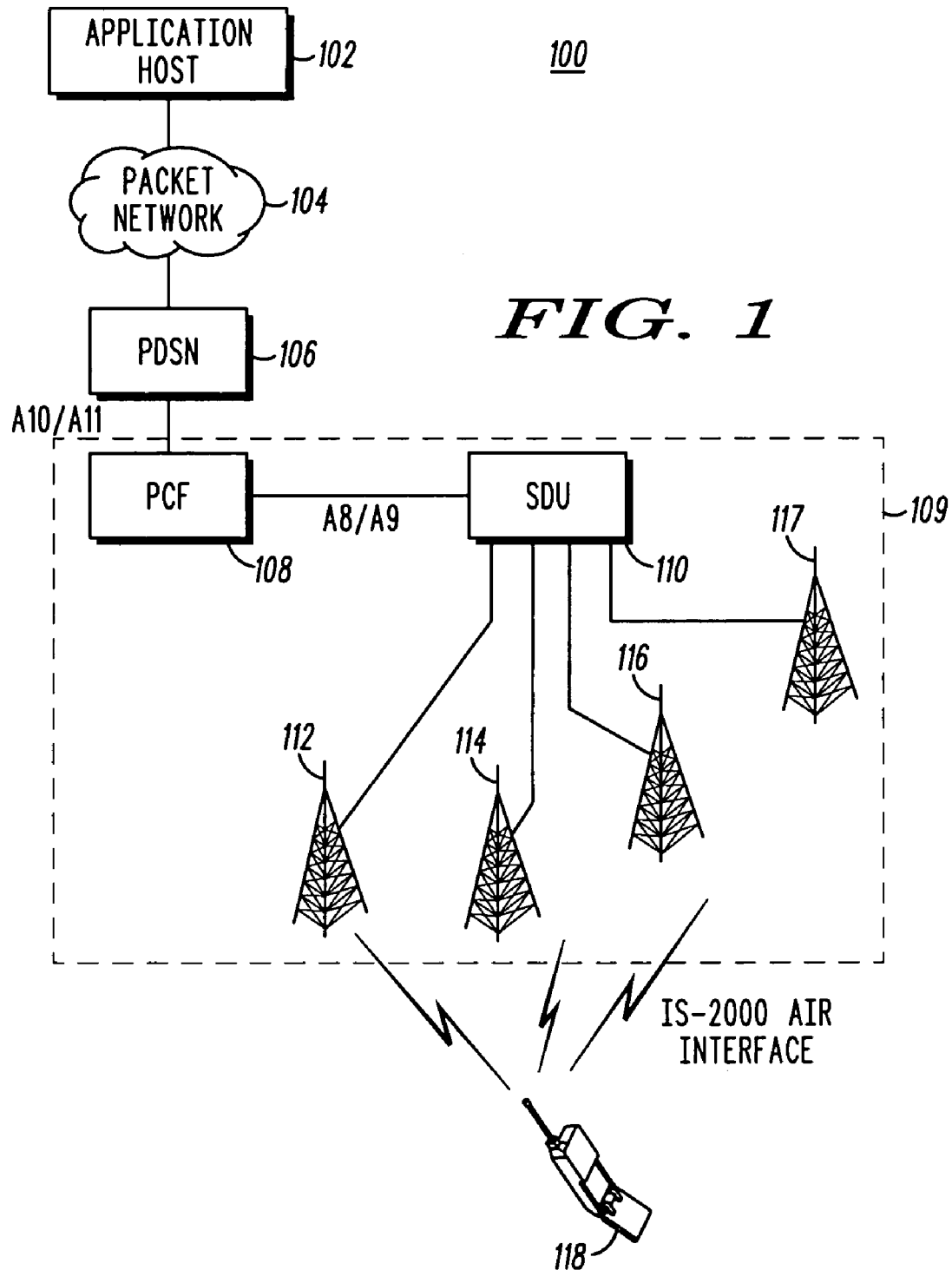
FIG. 1 is a functional block diagram of a system that can be used to implement the apparatus and method of the present invention.

The present invention introduces a mechanism for the RU to perform occasional pilot strength reporting on a reverse common signaling channel, which can enable infrastructure equipment to track the location of a RU and track the best pilots that the RU sees. When this mechanism is active and a dedicated RF connection between the RU and the infrastructure is being released, the RU receives a first message from the infrastructure instructing the RU to perform occasional pilot strength reporting on the reverse common signaling channel (r-csch) while the RU is in the idle state. In the idle state, the RU is not assigned a dedicated RF connection. In the preferred embodiment, the pilot strength reporting is limited by a maximum number of reports and/or a time limit to preserve battery life and prevent r-csch congestion in the system. Preferably, a Radio Environment Report Message, referred to generally herein as a second message, carries radio environment information (REI), such as pilot strength and phase of the best pilots measured, and helps the infrastructure both with tracking the RU location and with selecting a strong set of pilots for channel assignment.

The mechanism operates generally as follows. The RU receives a first message from the infrastructure instructing the RU to perform occasional radio environment reporting on the r-csch while in the idle state. While in the idle state, the RU maintains a pilot list. The preferred embodiment of the present invention initializes the pilot list to the last Active Set on the Traffic Channel just before the dedicated RF connection between the RU and the infrastructure is released and the RU transitions to the idle state. In an alternate embodiment, the method may initialize the pilot list to the current Active Set, which is defined as the Active Set on the Traffic Channel at the moment the RU receives the first message. The Active Set on the Traffic Channel is the set of pilots associated with the CDMA channels containing Forward Traffic Channels assigned to the RU. Subsequent to initialization of the pilot list, and while the RU is in the idle state, when the RU performs Idle Handoff to a pilot that is not contained in the pilot list, a new report is created and transmitted to the infrastructure. Also, the pilot list is updated. If a predetermined maximum number of radio environment reports are transmitted, if the radio environment report timer expires, if the RU is put on a traffic channel or if the RU hands off to a BTS that does not support the invention, radio environment reporting ceases.

In a first aspect of the invention, the preferred embodiment of the method of radio environment reporting in a remote unit that does not have dedicated traffic channel resources assigned comprises receiving a first message to perform radio environment reporting on a reverse common signaling channel; initializing a pilot list; storing the pilot list; determining whether the remote unit must send radio environment information; and when the remote unit must send radio environment information, updating the pilot list and transmitting the radio environment information to infrastructure equipment.

In a second aspect of the invention, the preferred embodiment of the method of radio environment reporting in infrastructure equipment comprises transmitting a first message to a remote unit, the first message instructing the remote unit to perform radio environment reporting on a reverse common signaling channel; initializing a pilot list; determining whether a second message has been received; and when a second message has been received, storing radio environment information contained in the second message.

Referring to FIG. 1, a functional block diagram of a system that can be used with the present invention is shown. It is assumed that the reader is familiar with cellular telephone systems and the manner in which messages are transmitted between a BTS serving a particular service cell and a RU located within that cell. To simplify the present description, only that portion of a cellular telephone system that is relevant to the present invention is discussed. FIG. 1 shows, a RU 118 in soft handoff with three BTSs 112, 114, 116 for communicating with an Application Host 102. A fourth BTS 117 not in soft handoff with the RU 118 is also shown. The Application Host 102 is coupled to a Packet Network 104 for uploading and downloading information. The Packet Network 104 is coupled to a PDSN 106. The PDSN 106 provides the interface between the Packet Network 104 and the infrastructure 109 for packet data services. The PDSN 106 is coupled to a PCF 108 over an A10/A11 interface (as specified in 3GPP2 A.S0001-A, "3GPP2 Access Network Interfaces Interoperability Specification", and subsequent versions). The PCF 108 provides buffering for data received from the PDSN 106. The PCF 108 is coupled to a Selection and Distribution Unit (SDU) 110 over an A8/A9 interface (as specified in 3GPP2 A.S0001-A and subsequent versions). The SDU 110 maintains soft handoffs between the RU 118 and the BTSs 112, 114, 116. The SDU 110 also selects the best data transmission received from the RU 118 via the BTS 112, 114, 116 for transmission to the PCF 108 and distributes copies of data destined for the RU 118 to all BTSs 112, 114, 116 that the RU 118 is in soft handoff with. The BTSs 112, 114, 116 transmit and receive bearer data and control information over a dedicated RF traffic channel to the RU 118. In the preferred embodiment of the present invention, the second messages transmitted by the RU 118 are stored in the infrastructure 109.

Figure 5:
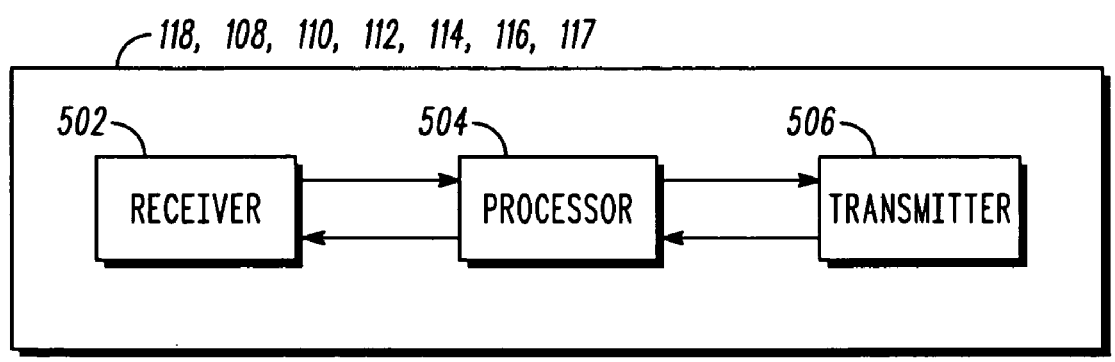
FIG. 5 is a simplified block diagram of a remote unit/infrastructure equipment that can be used to implement the present invention.

Referring to FIG. 5, a simplified block diagram of the RU 118 and infrastructure elements (PCF 108, SDU 110 and BTSs 112, 114, 116, 117) of FIG. 1 is shown. The RU 118 and infrastructure elements include a receiver 502 and transmitter 506, for receiving and transmitting signals, respectively. A processor 504 (any microprocessor or computer commonly known in the art) loaded with instructions for performing the method of the present invention is coupled to the receiver 502 and transmitter 506. Remaining elements and interfaces shown in FIG. 1 are commonly known in the art, and thus are not described further herein.

Figure 2:
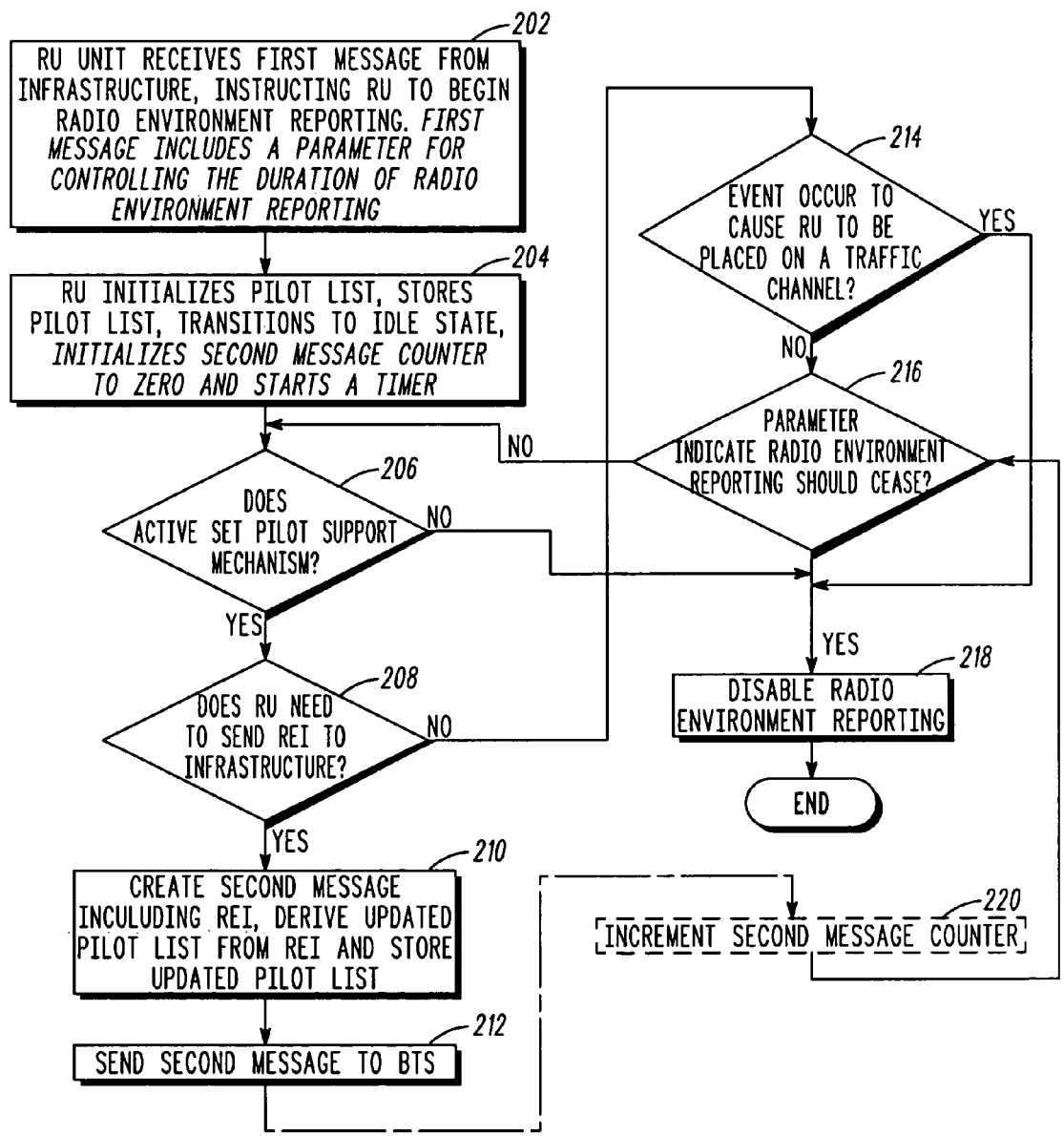
FIG. 2 is a flow chart of the preferred embodiment of the method of the present invention in the remote unit.

Turning to FIG. 2, a flowchart of the preferred embodiment of the method of the present invention is shown. When the RU 118 is on the traffic channel and a predetermined period of time passes during which no data is transmitted between the RU 118 and the infrastructure 109, the RU 118 receives a first message from the infrastructure 109 instructing it to begin occasional radio environment reporting on the r-csch (step 202) while in the idle state. In the preferred embodiment, a period of data inactivity over the dedicated RF channel triggers the method. It will be recognized by one of ordinary skill in the art that other triggers may be used. In the preferred embodiment, the first message includes a parameter that controls the duration of radio environment reporting. The parameter is preferably a timer value and/or a second message limit that will be used by the RU 118 to determine when to cease radio environment reporting. The timer value sets a limit on the amount of time the RU 118 is in the mode of providing radio environment reports to the infrastructure 109. The second message limit sets a limit on the number of second messages that the RU 118 generates and transmits to the infrastructure 109. At step 204, the method initializes the pilot list to the last Active Set on the Traffic Channel just before the RF connection between the RU 118 and the infrastructure 109 is released. In an alternate embodiment, the method initializes the pilot list to the current Active Set (as previously defined). At step 204, the method also stores the pilot list and transitions to the idle state.

Figure 4:
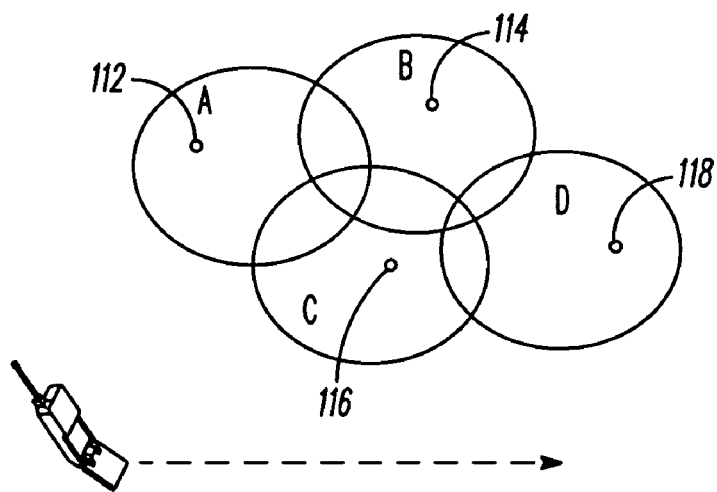
FIG. 4 is a diagram of a remote unit in soft handoff with three BTSs serving areas A, B and C, wherein, the remote unit is then released from the traffic channel to the idle state on one of the three BTS serving areas A, B or C, and then performs an idle handoff to a fourth BTS serving area D.

Referring briefly to FIG. 4, an example is shown where the Active Set on the Traffic Channel consists of pilots A, B and C in BTS 112, 114, 116, respectively. While the RU 118 is on the traffic channel, the Active Set monitored by the RU 118 can include a plurality of pilots. In the current example, these pilots are A, B and C and thus these pilots are initially included in the pilot list. The RU 118 transitions to the idle state, and while in the idle state, the Active Set monitored by the RU 118 can include only one pilot, typically the strongest pilot. In the current example, the RU 118 monitors the strongest of pilots A, B and C. While the RU 118 is in the idle state, it may change location such that the Active Set pilot changes. When the RU 118 becomes aware of a pilot that it stronger than A, B or C, say D, it performs an idle handoff to D and begins monitoring only D. Using these principles and referring back to FIG. 2, at step 206 the RU 118 determines whether the Active Set pilot supports the mechanism of the present invention. If the answer is no, the method disables radio environment reporting (step 218) and ends. If the answer is yes, the method determines whether the RU 118 needs to send REI to the infrastructure 109 (step 208). For example, the method determines whether the RU performed an idle handoff to a pilot that is not in the pilot list, and if so, determines the need to send REI to the infrastructure 109. If the RU 118 needs to send REI, the method creates a second message including the REI, derives an updated pilot list from the REI and stores the updated pilot list (step 210). An example algorithm for updating the pilot list is provided in section 2.1.1.4.1.5.2 of 3GPP2 C.S0004 "Signaling Link Access Control (LAC) Standard for cdma2000 Spread Spectrum Systems." Other algorithms for updating the pilot list may also be used with the present invention.

At step 212, the method transmits the second message to the infrastructure 109. Next the method determines whether the parameter indicates that radio environment reporting should cease (step 216). In one embodiment, the parameter is a limit of second messages that the RU 118 is allowed to transmit. In this embodiment, the method initializes a second message counter to zero (because the RU 118 has not yet sent any reports to the infrastructure 109) as shown in italics at step 204, and the method also increments a second message counter (step 220) after sending the second message (dotted line path in FIG. 2) and at step 216 compares the second message counter (number of messages transmitted) to the limit. If the limit is reached (yes path at step 216), the method disables radio environment reporting (step 218) and ends. In an alternate embodiment, the parameter is a limit on the amount of time the RU 118 is in the mode of radio environment reporting. In the alternate embodiment, the method starts a timer after receiving the first message (as shown in italics at step 204) and at step 216, the method determines whether the time limit is reached. If the time limit is reached, the method disables radio environment reporting (step 218) and ends. In yet another embodiment, the parameter may specify both a limit on second messages and a time limit. In all three embodiments, if comparisons with the parameter do not indicate that radio environment reporting should cease, the method proceeds to step 206. (During the second and subsequent performance of step 206, the method determines whether the Active set pilot has changed and whether the "new" Active Set pilot supports the mechanism.)

Referring back to step 208, if the RU 118 does not need to send REI to the infrastructure 109, the method determines whether an event has occurred to cause the RU 118 to be placed on a traffic channel (step 214). If the answer is yes, the method disables radio environment reporting (step 218) and the method ends. If the answer is no, the method proceeds to step 216 previously described. Examples of events causing the RU to be placed on a traffic channel are: the RU 118 has data to transmit to the infrastructure 109; the infrastructure 109 has data to transmit to the RU 118, or the RU 118 receives a request for voice service, to name a few.

The preferred embodiment of FIG. 2 illustrates one order in which the steps may be performed. A person of ordinary skill in the art will recognize that these steps, for example steps 206, 208, 214 and 216 may be performed in a different order or concurrently depending on the particular design or implementation chosen.

Turning now to the flow diagram of FIG. 3, the preferred embodiment of the method in the infrastructure 109 will now be described. In particular, the preferred embodiment is described with reference to the SDU 110. However, it should be recognized that the method can also be implemented in other elements within the infrastructure 109. The method can run in the infrastructure 109 on any microprocessor or computer commonly known in the art. The method begins at step 302, preferably when the infrastructure 109 detects a period of data inactivity over the RF connection between the infrastructure 109 and the RU 118. As stated previously, there may be other triggers. The infrastructure 109 sends a first message instructing the RU 118 to perform occasional radio environment reporting on the r-csch while in the idle state. The first message includes a parameter for controlling the duration of radio environment reporting as previously described. If the parameter is a limit on the number of second messages the RU 118 is allowed to transmit, at step 304, the method initializes a second message counter to zero (because the SDU 110 has not yet received any reports from the RU 118). If the parameter is a time limit on radio environment reporting, at step 304, the method starts a timer. If the parameter includes both a second message limit and a time limit, at step 304, the method initializes the second message counter and starts the timer. At step 304, the method also initializes the pilot list to the last Active Set on the Traffic Channel just before the RF connection between the RU 118 and the infrastructure 109 is released. In an alternate embodiment, the method may initialize the pilot list to the current Active Set on the Traffic Channel as previously described.

At step 306, the method queries whether the SDU 110 has received a second message from the RU 118. If a second message has not been received, the method proceeds to step 314 (described later herein). If a second message has been received, the method stores the REI contained in the message (step 308). The SDU 110 uses the stored REI to locate the RU 118 when the SDU 110 needs to provide a channel assignment to the RU 118. The SDU 110 also uses the pilot strengths stored with the REI to select a strong set of pilots to include in the channel assignment.

At step 312, the method determines whether the parameter indicates that radio environment reporting should cease. If the parameter is a limit of second messages that the RU 118 is allowed to transmit, the method increments the second message counter (step 310 shown in dotted lines) and at step 312 compares the second message counter (number of messages received) with the limit. If the message limit is reached, the method ends. When the method ends, the SDU 110 may delete the REI or keep it for a period of time. If the parameter is a time limit on radio environment reporting, at step 312 the method determines whether the time limit is reached. If the time limit is reached, the method ends. At step 312, if the comparisons with the parameter do not indicate that radio environment reporting should cease, the method proceeds to step 314.

At step 314, the method determines whether an event has occurred to provide the RU 118 with a traffic channel assignment. If such an event has occurred, the method determines whether the event is a traffic channel request by the RU 118 (step 316). If the event is a traffic channel request by the RU 118, the method ends. If the event is not a traffic channel request by the RU 118, the method uses the stored REI to determine the RU's location and select a strong set of pilots to include in a channel assignment, sends the traffic channel assignment (step 318) and ends. At step 314, if an event has not occurred to provide the RU 118 with a traffic channel assignment, the method proceeds to step 306 and continues processing as previously described.

Figure 3:
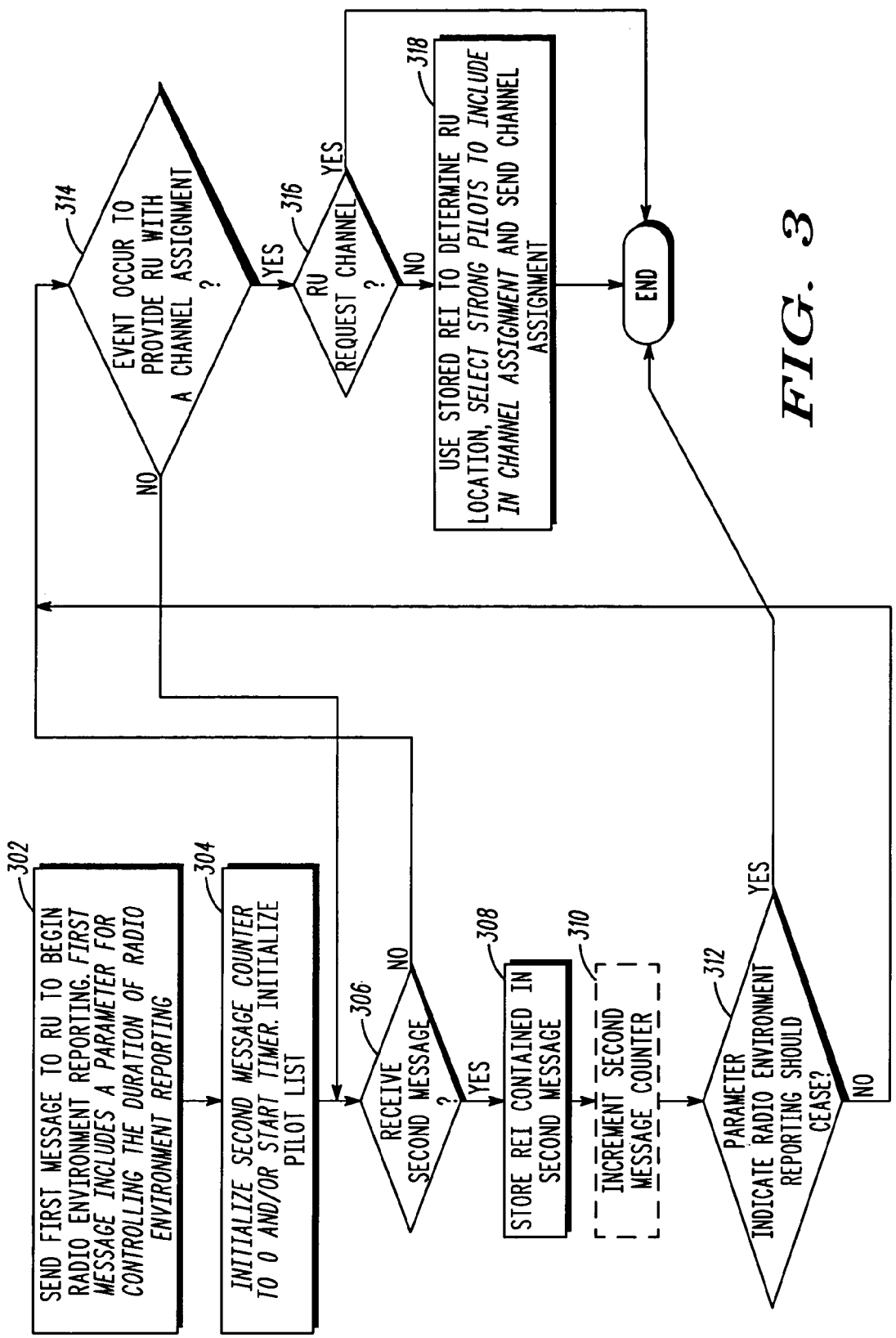
FIG. 3 is a flow chart of the preferred embodiment of the method of the present invention in the infrastructure.

Again, the preferred embodiment of FIG. 3 illustrates one order in which the steps may be performed. A person of ordinary skill in the art will recognize that these steps, in particular steps 312 and 314 may be performed in a different order or concurrently depending on the particular design or implementation chosen.

The present invention decreases the call setup time for putting a RU on a traffic channel. When the SDU 110 is provided with radio environment reports that can be used to quickly locate the RU and determine a best set of Active Set pilots for channel assignment, the page/page response procedure is eliminated. The call set up time savings is particularly significant in a packet data system, where the demand for fast and accurate information access is high. The invention may also be used to send the RU, such as a mobile station, a mobile-directed message (such as SMS) over just a few cells rather than using page/page response or flooding the paging area with the SMS. This would improve paging channel bandwidth, and/or reduce delay to deliver the SMS.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method of radio environment reporting in a remote unit that does not have dedicated traffic channel resources assigned, the method comprising:
   receiving a first message to perform radio environment reporting on a reverse common signaling channel;
   initializing a pilot list;
   storing the pilot list;
      determining whether the remote unit must send radio environment information which comprises determining whether the remote unit performed an idle handoff to a pilot that is not in the pilot list;
      when the remote unit performed an idle handoff to a pilot that is not in the pilot list, the remote unit updating the pilot list; and
      transmitting the radio environment information to an infrastructure equipment.

2. The method of claim 1 wherein receiving a first message comprises receiving a parameter that controls a duration of radio environment reporting.

3. The method of claim 2 wherein receiving a parameter comprises receiving a timer value that sets a limit on the amount of time the remote unit is in a mode of providing radio environment information to the infrastructure equipment.

4. The method of claim 2 wherein receiving a parameter comprises receiving a limit on a number of second messages that the remote unit transmits to the infrastructure equipment.

5. The method of claim 3 wherein after receiving the first message, the method starts a timer and wherein, when the timer expires, the method discontinues radio environment reporting.

6. The method of claim 4 wherein after receiving the first message, the method initializes a second message counter to zero, increments the value of the second message counter when a second message is sent or received, and wherein, when a value of the second message counter is equal to the limit on second messages, the method discontinues radio environment reporting.

7. The method of claim 1 wherein initializing a pilot list comprises initializing a pilot list to a last Active Set on a Traffic Channel just before a dedicated RF connection between the remote unit and the infrastructure equipment is released.

8. The method of claim 1 wherein initializing a pilot list comprises initializing a pilot list to a current Active Set, wherein the current Active Set is an Active Set on a Traffic Channel at a moment the remote unit receives the first message.

9. The method of claim 1 wherein when the remote unit does not need to send radio environment information, the method comprises determining whether an event has occurred to place the remote unit on a traffic channel; and when an event has occurred, discontinuing radio environment reporting.

10. A method of radio environment reporting in an infrastructure equipment comprising:
   transmitting a first message to a remote unit, the first message instructing the remote unit to perform radio environment reporting on a reverse common signaling channel, wherein the first message comprises a parameter that controls a duration of radio environment reporting;
   initializing a pilot list;
   determining whether a second message has been received; and
   when a second message has been received, storing radio environment information contained in the second message;
   wherein the parameter comprises a timer value that sets a limit on the amount of time the remote unit is in a mode of providing radio environment information to the infrastructure equipment.

11. The method of claim 10 further comprising:
   determining a location of the remote unit using the stored radio environment information; and
   sending a traffic channel assignment to the remote unit.

12. The method of claim 10 wherein initializing a pilot list comprises initializing a pilot list to a last Active Set on a Traffic Channel just before a dedicated RF connection between the remote unit and the infrastructure equipment is released.

13. The method of claim 10 wherein initializing a pilot list comprises initializing a pilot list to a current Active Set, wherein the current Active Set is an Active Set on a Traffic Channel at a moment the remote unit receives the first message.

14. A method of radio environment reporting in an infrastructure equipment comprising:
   transmitting a first message to a remote unit, the first message instructing the remote unit to perform radio environment reporting on a reverse common signaling channel, wherein the first message comprises a parameter that controls a duration of radio environment reporting;
   initializing a pilot list;
   determining whether a second message has been received; and
   when a second message has been received, storing radio environment information contained in the second message; and
   wherein the parameter comprises a limit on a number of second messages that the remote unit transmits to the infrastructure equipment.

15. The method of claim 14 wherein initializing a pilot list comprises initializing a pilot list to a last Active Set on a Traffic Channel just before a dedicated RF connection between the remote unit and the infrastructure equipment is released.

16. The method of claim 14 wherein initializing a pilot list comprises initializing a pilot list to a current Active Set, wherein the current Active Set is an Active Set on a Traffic Channel at a moment the remote unit receives the first message.

17. A storage medium having stored thereon a set of instructions which, when loaded into a processor of an infrastructure equipment, causes the equipment to:
   transmit a first message to a remote unit, the first message instructing the remote unit to perform radio environment reporting on a reverse common signaling channel, wherein the first message comprises a parameter that controls a duration of radio environment reporting;
   initialize a pilot list;
   determine whether a second message has been received; and
   when a second message has been received, store radio environment information contained in the second message;

wherein the parameter comprises a timer value that sets a limit on the amount of time the remote unit is in a mode of providing radio environment information to the infrastructure equipment.

18. A storage medium having stored thereon a set of instructions which, when loaded into a processor of a remote unit, causes the unit to:

receive a first message to perform radio environment reporting on a reverse common signaling channel;

initialize a pilot list;

store the pilot list;

determine whether the remote unit must send radio environment information by determining whether the remote unit performed an idle handoff to a pilot that is not in the pilot list;

when the remote unit performed an idle handoff to a pilot that is not in the pilot list, update the pilot list; and transmit the radio environment information to an infrastructure equipment.

19. A storage medium having stored thereon a set of instructions which, when loaded into a processor of an infrastructure equipment, causes the equipment to:

transmit a first message to a wireless remote unit, the first message instructing the remote unit to perform radio environment reporting on a reverse common signaling channel, wherein the first message comprises a parameter that controls a duration of radio environment reporting;

initialize a pilot list;

determine whether a second message has been received; and when a second message has been received, store radio environment information contained in the second message;

wherein the parameter comprises a limit on a number of second messages that the remote unit transmits to the infrastructure equipment.

* * * * *